United States Patent [19]

Choi

[11] Patent Number: 5,710,490

[45] Date of Patent: Jan. 20, 1998

[54] METHOD OF REDUCING EXECUTION TIME FOR POSITION COMMAND IN POSITION SERVO SYSTEM

[75] Inventor: Sang-jin Choi, Seoul, Rep. of Korea

[73] Assignee: Samsung Electronics Co., Ltd., Kyungki-do, Rep. of Korea

[21] Appl. No.: 581,910

[22] Filed: Jan. 2, 1996

[51] Int. Cl.[6] .................... G05B 19/25; G06G 7/64
[52] U.S. Cl. .................... 318/573; 395/87; 364/474.31; 318/600
[58] Field of Search .................... 318/573, 569, 318/632, 608, 605, 600, 661; 395/91, 95, 87, 97, 82, 86; 364/474.12, 474.28, 474.31

[56] References Cited

U.S. PATENT DOCUMENTS

| | | | |
|---|---|---|---|
| 3,591,781 | 7/1971 | Brenza | 318/608 |
| 4,041,287 | 8/1977 | Kolell et al. | 318/569 |
| 5,187,417 | 2/1993 | Minnich et al. | 318/254 |
| 5,327,523 | 7/1994 | Itoh | 395/95 |
| 5,374,883 | 12/1994 | Morser | 318/605 |

*Primary Examiner*—John W. Cabeca
*Attorney, Agent, or Firm*—Burns, Doane, Swecker & Mathis, LLP

[57] ABSTRACT

A method of reducing execution time for a position command in a position servo system is described in which a position command is transmitted from a main controller to the position servo at a first predetermined time interval and the position servo interpolates and executes a first part of the transmitted position command at a second predetermined time interval which is less than the first predetermined time interval. Execution of the position command is paused for a predetermined period of time during which a non-executed part of the position command is calculated and stored into the position servo buffer. After the predetermined pause time, the non-executed part of the position command is executed.

2 Claims, 3 Drawing Sheets

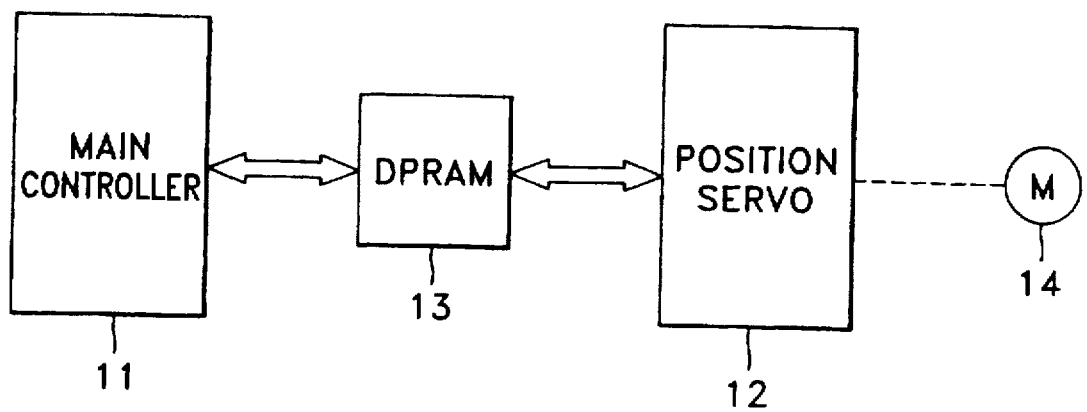
FIG._1
*(PRIOR ART)*
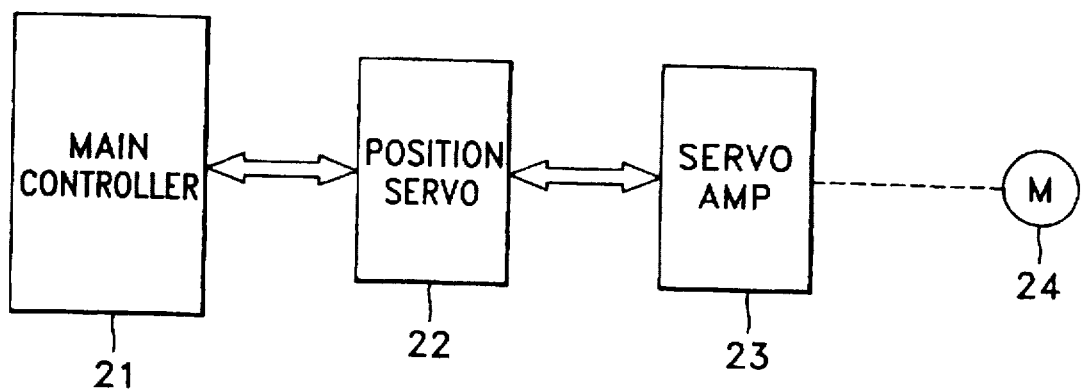
FIG._2

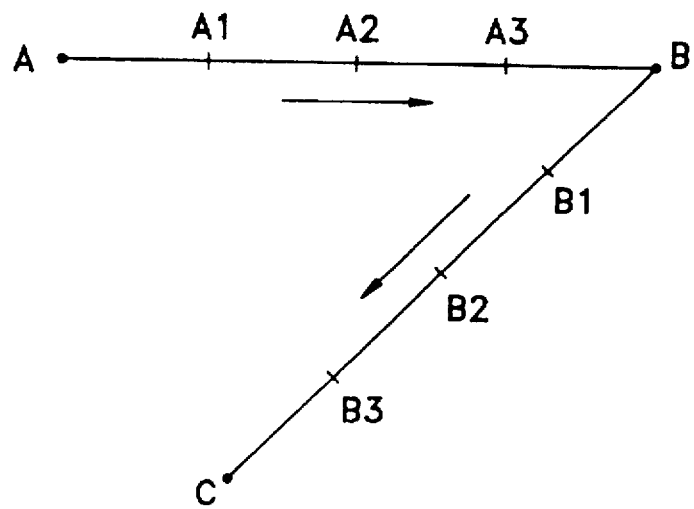
FIG._3
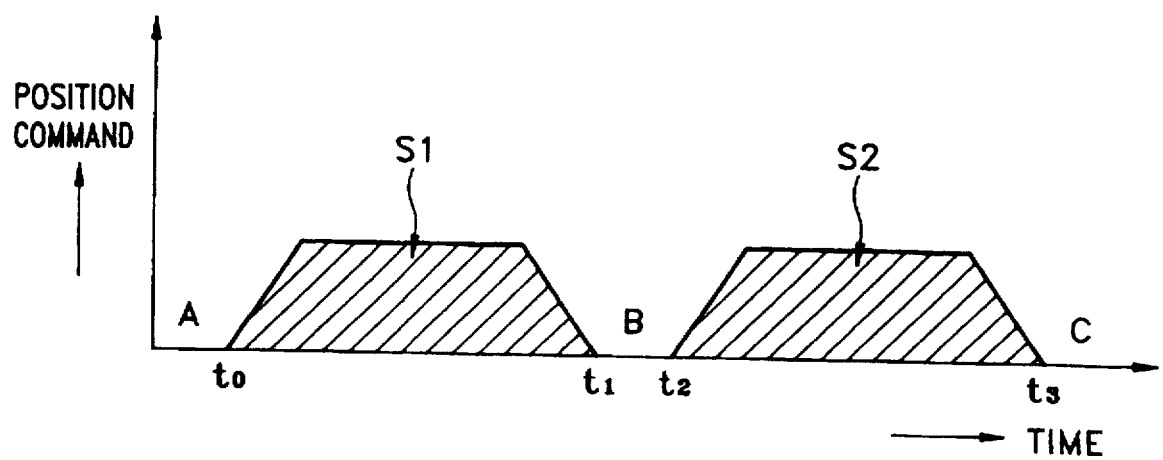
FIG._4
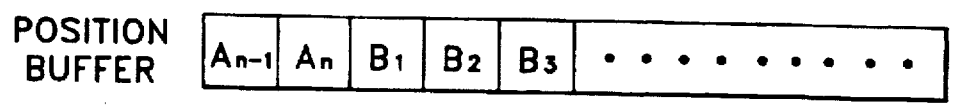
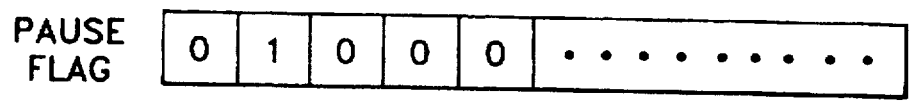
FIG._5

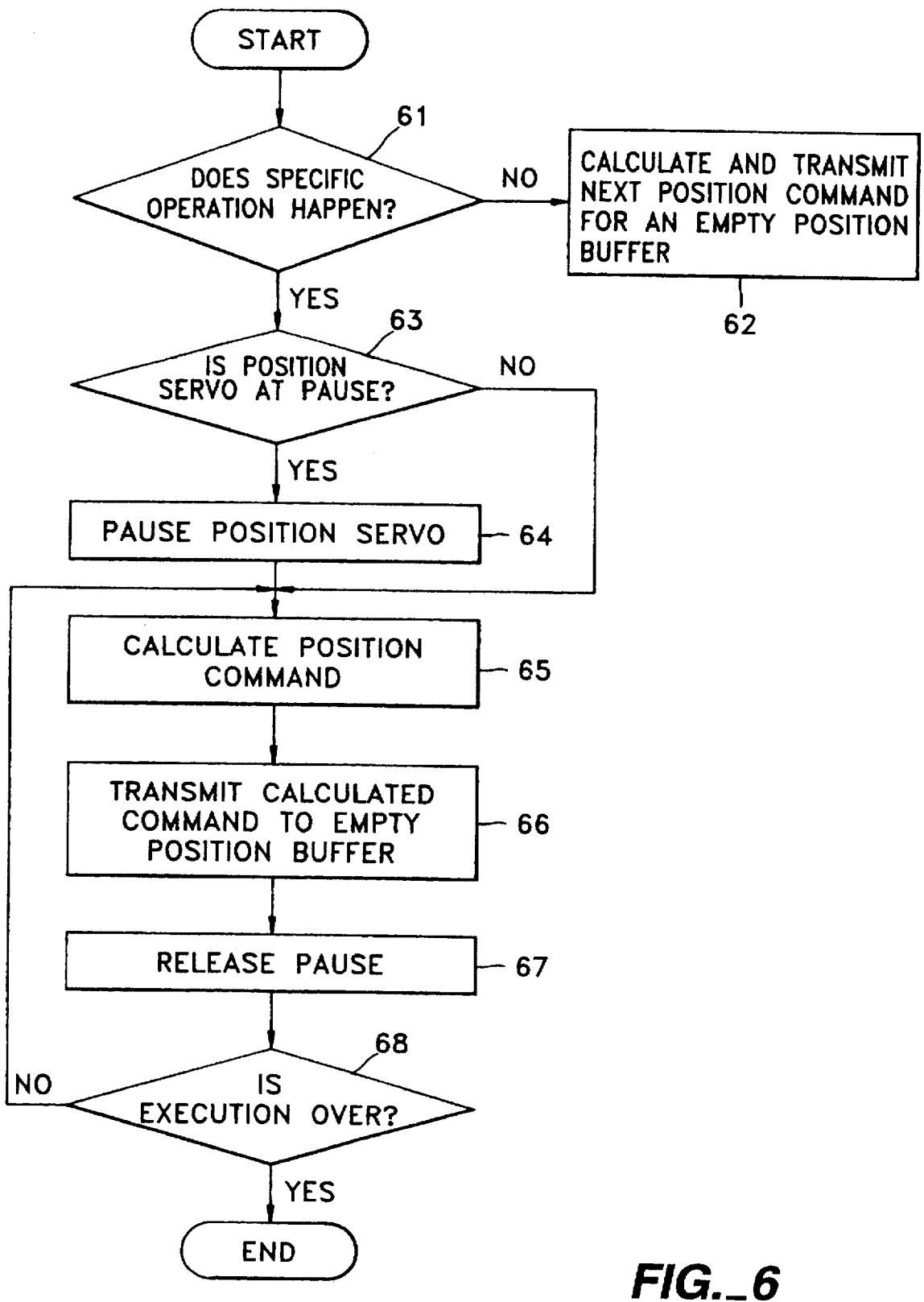
FIG._6

METHOD OF REDUCING EXECUTION TIME FOR POSITION COMMAND IN POSITION SERVO SYSTEM

BACKGROUND OF THE INVENTION

The present invention relates to a position servo system, and more particularly, to a method of reducing the execution time for a position command from a main controller in a position servo system, which is capable of reducing the time required for carrying out the position command through interpolation.

In general, a conventional position servo system receives a position command from a main controller at predetermined time intervals, to interpolate the received position command and then execute the interpolated position command. Therefore, in the actual performance of such a position command, there is an unnecessary time delay for the interpolation, thereby lowering the efficiency of the system.

This problem will be detailed with reference to FIG. 1 which shows schematically the arrangement of one example of a conventional position servo system.

Referring to FIG. 1, the conventional position servo system is provided with a main controller 11 and a position servo 12 as essential components, between which a dual-port RAM (DP-RAM) 13 is provided for intercommunicating the states of main controller 11 and position servo 12. In FIG. 1, reference numeral 14 denotes a motor for driving position servo 12.

A position command is transmitted at a predetermined time interval from main controller 11, and recorded in a reserved address of DP-RAM 13. Thereafter, main controller requires an interrupt to position servo 12. Then, position servo 12 reads the position command from DP-RAM 13, interpolates the read position command and performs the interpolated position command. Main controller 11 reads a specific address of DP-RAM 13 to confirm whether the position servo 12 carries out the position command properly and recognizes a current location.

However, in such a conventional position servo system, the position command is repeatedly supplied to position servo 12 every predetermined time interval, and the position command is actually carried out only after the time required for interpolating has lapsed. Thus, the efficiency of the system decreases.

SUMMARY OF THE INVENTION

To solve such a problem, it is an object of the present invention to provide a method of shortening execution time for a position command from a main controller in a position servo system, which is capable of reducing the time required for carrying out the position command through interpolation.

To accomplish the above object, there is provided a method of reducing execution time for a position command in a position servo system, comprising the steps of: (a) transmitting a position command from a main controller to a position servo at a first predetermined time interval; (b) interpolating said transmitted position command at a second predetermined time interval which is less than said first time interval; (c) executing said interpolated position command; (d) pausing said position command execution for a predetermined period of time, while performing said step (c); (e) calculating the non-executed part of said position command and buffering said calculated position command in said position servo, during said predetermined pause time period; and (f) executing said non-executed part of the position servo, after said predetermined pause time period.

BRIEF DESCRIPTION OF THE DRAWINGS

The above object and advantage of the present invention will become more apparent by describing in detail a preferred embodiment thereof with reference to the attached drawings in which:

FIG. 1 is a schematic block diagram of a conventional position servo system;

FIG. 2 is a schematic block diagram of a position servo system, for illustrating a method for reducing the time required for executing a position command according to the present invention;

FIG. 3 is a diagram for illustrating an execution order of the position command in the position servo shown in FIG. 2;

FIG. 4 illustrates a waveform of a position command signal transmitted to the position servo from the main controller shown in FIG. 2;

FIG. 5 illustrates the relationship between a position buffer and a pause flag in the position servo shown in FIG. 2; and FIG. 6 is a flowchart for illustrating a method of reducing the time required for executing a position command in a position servo system according to the present invention.

DETAILED DESCRIPTION OF THE INVENTION

Referring to FIG. 2, a main controller 21 transmits a position command signal to a position servo 22 every predetermined time interval (typically eight or sixteen milliseconds). Then, position servo 22 interpolates the position command signal at an interval of one millisecond and performs the interpolated position command. For example, in the case of executing a position command from a position A to a position C via a position B, as shown in FIG. 3, main controller 21 transmits a position command signal having a waveform as shown in FIG. 4 to position servo 22. Such a position command signal is transmitted in a positional sequence of A→A1→A2→A3→B→B1→B2→B3→C. Here, the position command signal from main controller 21 is transmitted to an empty buffer in position servo 22 and then buffered (refer to step 62 in FIG. 6).

Meanwhile, in the process of executing the position command according to the sequence of FIG. 4, supposing that the position control is performed after a specific operation occurs at the B point for a predetermined period of time (refer to step 61 in FIG. 6) toward the C point, main controller 21 awaits the completion of the specific operation at the B point. At this time, position servo 22 is at pause (refer to steps 63 and 64 of FIG. 6).

Here, while awaiting the completion of the specific operation, main controller 21 calculates a position command S2 for a path moving from B to C and transmits the calculated position command S2 to position servo 22, so that the buffering is performed in advance (step 66 of FIG. 6). Here, a reference code S1 indicates a position command for a path moving from A to B. Also, while position command S2 calculated above is being transmitted to position servo 22 and buffered therein, main controller 21 pauses servo 22, so as to prevent the immediate execution of the position command (step 64 of FIG. 6). At this time, the relative timing relationship between the position buffer and a pause flag in position servo 22 is as shown in FIG. 5. That is, when position servo 22 executes a command (An) transmitted from main controller 21, a pause flag corresponding to command (An) indicates a logic 1 so that position servo 22 comes to a standstill at this point. At this time, main controller 21 waits for the completion of the specific operation as described above. During that waiting time, main controller 21 transmits the position command S2 for the path moving from B to C (i.e., position commands of points B1, B2 and B3) to position servo 22, to thereby perform buffering as in FIG. 5.

On the other hand, if the specific operation is completed, main controller 21 transmits a pause-releasing command signal to position servo 22. The position servo 22 which has received this pause-releasing command goes out of the pause state (step 67) and executes the position commands in the following sequence of B1, B2 and B3. In other words, since the next position command is previously calculated and buffered by main controller 21, position servo 22 can carry out the next position command without time delay required to calculate and buffer the next position command.

As described above, in the method of reducing the execution time for the position command in the position servo system according to the present invention in which the position servo is at pause for a predetermined period of time and executes the position command again, since the next position command is calculated and buffered in advance during the standstill of the position servo, the next position command can be promptly carried out. Therefore, the operation time can be reduced so that the efficiency of the system can be improved.

What is claimed is:

1. A method of reducing execution time for a position command in a position servo system, comprising the steps of:
   (a) transmitting a position command from a main controller to a position servo at a first predetermined time interval;
   (b) interpolating a part of said transmitted position command at a second predetermined time interval which is less than said first time interval;
   (c) executing said interpolated position command;
   (d) pausing said position servo so as to pause position command execution for a predetermined period of time;
   (e) calculating a non-executed part of said position command to provide a calculated position command and buffering said calculated position command in said position servo, during said predetermined pause time period; and
   (f) executing said non-executed part of the position command, after said predetermined pause time period.

2. A method of reducing execution time for a position command in a position servo system as claimed in claim 1, wherein said second time interval is one millisecond.

* * * * *